United States Patent [19]

Nagano

[11] Patent Number: 5,469,299
[45] Date of Patent: Nov. 21, 1995

[54] OBJECTIVE LENS SYSTEM

[75] Inventor: Chikara Nagano, Tokyo, Japan

[73] Assignee: Olympus Optical Co., Ltd., Tokyo, Japan

[21] Appl. No.: 155,917

[22] Filed: Nov. 23, 1993

Related U.S. Application Data

[63] Continuation of Ser. No. 793,160, Nov. 18, 1991, abandoned.

[30] Foreign Application Priority Data

May 15, 1990 [JP] Japan .................................. 2-122936

[51] Int. Cl.$^6$ .......................... G02B 21/02; G02B 13/14
[52] U.S. Cl. .......................... 359/661; 359/355; 359/357; 359/656
[58] Field of Search ................................ 359/642, 677, 359/656–661, 689–690, 784, 790–792, 350, 355–357

[56] References Cited

U.S. PATENT DOCUMENTS

| | | | |
|---|---|---|---|
| 3,700,311 | 10/1972 | Shoemaker | 359/656 |
| 3,879,111 | 4/1975 | Goto | 359/659 |
| 4,184,747 | 1/1980 | Uetake | 359/659 |
| 4,232,940 | 11/1980 | Nakagawa | 359/658 |
| 4,537,472 | 8/1985 | Asoma | 359/658 |
| 4,978,204 | 12/1990 | Ito | 359/689 |
| 5,076,676 | 12/1991 | Saito | 359/656 |
| 5,103,341 | 4/1992 | Ulrich et al. | 359/354 |
| 5,121,255 | 6/1992 | Hayashi | 359/661 |
| 5,132,845 | 7/1992 | Suzuki | 359/656 |
| 5,142,409 | 8/1992 | Hanzawa et al. | 359/656 |
| 5,159,492 | 10/1992 | Hayashi | 359/355 |

FOREIGN PATENT DOCUMENTS

| | | |
|---|---|---|
| 1319720 | 12/1989 | Japan . |
| 1319719 | 12/1989 | Japan . |

OTHER PUBLICATIONS

L. V. Foster, et al., "An Achromatic Ultraviolet Microscope Objective", J.O.S.A., vol. 38, pp. 689–692, Aug. 1948.

*Primary Examiner*—Thong Q. Nguyen
*Attorney, Agent, or Firm*—Cushman, Darby & Cushman

[57] ABSTRACT

A high resolution objective lens system for use in the ultraviolet region around 250 nm comprising in order from the object side: a first lens unit comprising a meniscus lens component having an object side concave surface having high curvature and a positive lens component, and having a positive refractive power as a whole; a second lens unit comprising at least two cemented lens components and having a positive refractive power as a whole; and a third lens unit comprising a cemented lens component and having a negative refractive power as a whole: each of the lens elements arranged in the lens units being made of an optical material which has, a thickness of at least 5 mm, and an internal transmittance of at least 50% for a ray having a wavelength of 300 nm.

14 Claims, 6 Drawing Sheets

OBJECTIVE LENS SYSTEM

This is a continuation of application Ser. No. 07/793,160, filed on Nov. 18, 1991, which was abandoned upon the filling thereof.

BACKGROUND OF THE INVENTION a) Field of the Invention

The present invention relates to an objective lens system which uses rays within the near ultraviolet region around 250 nm.

b) Description of the Prior Art

The objective lens system which use rays in the near ultraviolet region around 250 nm are applied to high resolution imaging optical systems, research of living organisms by utilizing the ultraviolet rays as well as research and application of laser lights and so on. Though the reflection type of objective lens systems is used widely in these fields of application, the refraction type of objective lens systems are more advantageous for research of living organisms by utilizing the ultraviolet rays and laser lights as well as the other application for which high resolution is required.

A refraction type of objective lens system which uses the ultraviolet rays is described on pages 689–692, Vol. 38 of the J.Opt. Soc.Am. This objective lens system is of a glycerine oil immersion type, and has a high magnification, a large numerical aperture and favorably corrected spherical aberration.

Further, the objective lens systems for the ultraviolet region disclosed by Japanese Patent Kokai Publication No. Hei 1-319719 and No. Hei 1-319720 have low magnifications and small numerical apertures, but spherical aberration corrected relatively favorably with small numbers of lens elements.

However, the objective lens system described in the J.Opt. Soc.Am. has remarkable curvature of field and a very narrow effective visual field, and is of the glycerine oil immersion type which cannot be applied to the research of semiconductors and laser lights.

Furthermore, the objective lens system disclosed by each of the above-mentioned Japanese patents has low magnification and small numerical aperture owing to a fact that it is composed of a small number of lens elements, and is nevertheless insufficient in correction of chromatic aberration and curvature of field.

SUMMARY OF THE INVENTION

A primary object of the present invention is to provide a refraction type high resolution objective lens system which has chromatic aberration corrected favorably at wavelengths around 250 nm and assures high image quality even at the marginal portion of an image field.

The objective lens system according to the present invention comprises, in order from the object side, a first lens unit comprising a meniscus lens component which has an object side concave surface having high curvature and a positive lens component having an emergence side convex surface, a second lens unit comprising at least two cemented lens components, and a third lens unit comprising a negative cemented lens component and having a negative refractive power as a whole. Further, the objective lens system according to the present invention is composed only of lens elements each of which is made of an optical material exhibiting, at thickness of 5 mm, internal transmittance of 50% for a ray having a wavelength of 300 nm.

Optical systems which are to be used at the wavelengths around 250 nm, like the objective lens system according to the present invention, must be made of optical materials having high transmittance for the rays having these wavelengths. These optical materials are ordinarily limited to calcium fluoride ($CaF_2$), lithium fluoride (LiF), fused quartz (or synthetic quartz) and so on.

These materials have refractive indices of 1.42 to 1.51 within the above-mentioned wavelength region and dispersive powers which are not distributed within a broad range. It is therefore difficult to design an objective lens system which has a high magnification, a flat image surface and chromatic aberration which is corrected within a certain range within this wavelength region.

The objective lens system according to the present invention is composed as described above, and therefore has a high magnification, a high numerical aperture and high resolution within a range of scores of nanometers which are obtained by overcoming the difficulty described above.

Owing to the fact that the first lens component arranged in the first lens unit is designed as the meniscus lens component which has the object side concave surface having the high curvature, the objective lens system according to the present invention is capable of correcting spherical aberration and assuring the flatness of the image surface over the entire range of a wide image field in spite of the large numerical aperture the objective lens system.

By designing the first lens component as a cemented doublet, it is possible to correct longitudinal chromatic aberration and lateral chromatic aberration more favorably. When the first lens component is a cemented doublet, it is desirable that the lens element arranged on the object side in the cemented doublet is designed as a negative lens element made of a quartz material and the lens element arranged on the emergence side is designed as a positive lens element made of calcium fluoride or lithium fluoride. Further, it is effective for correction of spherical aberration to design the second lens component in the first lens unit as a lens component having a positive refractive power and a convex surface on the emergence side.

When the objective lens system according to the present invention is to have a magnification on the order of 80× to 100×, it is preferable to design the first lens unit so as to satisfy the following condition (1):

$$0.5 \leq f_f/f \leq 3 \quad (1)$$

wherein the reference symbol $f_f$ represents the focal length of the first lens unit and the reference symbol $f$ designates the focal length of the objective lens system as a whole.

If the upper limit of the condition (1) is exceeded, the second lens unit will have a strengthened power, thereby making it difficult to correct chromatic aberration. If the lower limit of the condition (1) is exceeded, in contrast, spherical aberration will be corrected insufficiently in the first lens unit and can hardly be corrected by the second and third lens units.

The second lens unit of the objective lens system according to the present invention comprises at least two cemented lens components and has a role for correcting chromatic aberration with especial preponderance. The cemented lens components should desirably be made of positive lens elements made of calcium fluoride or lithium fluoride and negative lens elements made of quartz material. Chromatic aberration can be corrected with a smaller number of cemented lens components when some or all of these lens components are designed as triplets. Such reduction in the number of lens components arranged in the second lens unit is effective, when a wide band anti-reflection coating is not used in the above-mentioned wavelength region, for narrowing air-contact surfaces on the lens components and enhancing spectral transmittance thereof, thereby reducing detrimental rays producing flare and so on.

When the objective lens system according to the present invention is to have the magnification on the order of 80× to 100×, it is desirable that the second lens unit satisfies the following condition (2):

$$3 \leq f_{II}/f \leq 15 \qquad (2)$$

wherein the reference symbol $f_{II}$ represents the focal length of the second lens unit.

If the upper limit of the condition (2) is exceeded, the first lens unit must have a strengthened refractive power for maintaining the magnification of the objective lens system as a whole, thereby making it difficult to correct spherical aberration and maintain the flatness of the image surface. If the lower limit of the condition (2) is exceeded, in contrast, it will be impossible to correct chromatic aberration.

The third lens unit is arranged with a relatively wide airspace interposed between the second lens unit and the third lens unit, and comprises a negative cemented lens component and has a negative refractive power as a whole. Owing to the fact that the negative refractive power is imparted to the third lens unit, the objective lens system according to the present invention has a high magnification, maintains a desired working distance, corrects spherical aberration and chromatic aberration favorably in the lens system as a whole, and assures a flatness of the image surface. It is advantageous for maintaining the flatness of the image surface of the objective lens system as a whole to design the cemented lens component arranged in the third lens unit so as to have a meniscus shape. Further, it is desirable that at least one of positive lens elements arranged in the third lens unit is made of a quartz material and that at least one of the negative lens elements arranged in the third lens unit is made of calcium fluoride or lithium fluoride. Such selections of the materials will permit effective correction of lateral chromatic aberration in the objective lens system as a whole.

When the objective lens system according to the present invention is to have the magnification on the order of 80× to 100×, it is desirable to design the third lens unit so as to satisfy the following condition (3):

$$-f_{III}/f \geq 7 \qquad (3)$$

wherein the reference symbol $f_{III}$ represents the focal length of the third lens unit.

If the lower limit of the condition (3) is exceeded, each of the lens units will have a strengthened refractive power, thereby making it difficult to correct spherical aberration. In such a case, problems will be posed at the assembly stage of the objective lens system since manufacturing errors of the lens elements influence largely on aberrations.

Furthermore, it is desirable for favorable correction of aberrations to reserve, between the second lens unit and the third lens unit, an airspace which satisfies the following condition (4):

$$D/f \geq 4 \qquad (4)$$

wherein the reference symbol D represents the width of the airspace.

If the lower limit of condition (4) is exceeded, it will be difficult to correct lateral chromatic aberration and obtain a flatness of the image surface.

The objective lens system according to the present invention described above is to be used at the short wavelengths around 250 nm and has a resolution approximately twice as high as that of an ordinary objective lens system for optical microscopes which has the same numerical aperture as that of the objective lens system according to the present invention and is to be used at the wavelengths of the visible rays. Further, the present invention makes it possible to design a scanning ultraviolet objective lens system which has a higher resolution in combination with the high magnification and the large numerical aperture described above. Furthermore, it is conceivable to apply the objective lens system according to the present invention in a variety of fields, for example, to research, inspection and measurement of super LSI's as well as studies on chromosomes, living organisms, etc.

In addition, available as the light sources emitting rays having wavelengths around 250 nm are excimer laser KrF (having a wavelength of 249 nm) and second harmonic of $Ar^+$ laser (having a wavelength of 257 nm or 244 nm), and the objective lens system according to the present invention is applicable to research of these laser lights. Super high pressure mercury lamps (emitting a ray having a wavelength of 254 nm), xenon lamps and so on are utilizable as ordinary light sources for use with the objective lens system according to the present invention.

DETAILED DESCRIPTION OF THE PREFERRED EMBODIMENTS

Figure 1:
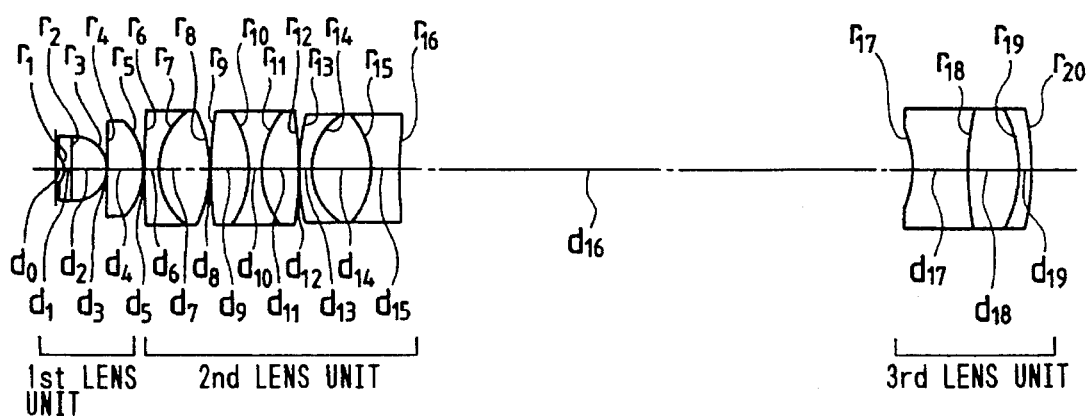
FIG. 1 through FIG. 6 show sectional views illustrating compositions of Embodiments 1 through 6 respectively of the objective lens system according to the present invention.

Now, the present invention will be described more detailedly below with reference to the preferred embodiments illustrated in the accompanying drawings and given in the form of the following numerical data:

| Embodiment 1 | | |
|---|---|---|
| f = 1, β = −100, NA = 0.8 | | |
| | $d_0 = 0.063$ | |
| $r_1 = -0.604$ | | |
| | $d_1 = 0.248$ | quartz |
| $r_2 = \infty$ | | |
| | $d_2 = 0.956$ | $CaF_2$ |
| $r_3 = -0.802$ | | |
| | $d_3 = 0.030$ | |
| $r_4 = -14.05$ | | |
| | $d_4 = 0.952$ | $CaF_2$ |
| $r_5 = -1.71$ | | |
| | $d_5 = 0.042$ | |
| $r_6 = 91.4$ | | |
| | $d_6 = 0.316$ | quartz |
| $r_7 = 1.84$ | | |
| | $d_7 = 1.33$ | $CaF_2$ |
| $r_8 = -3.68$ | | |
| | $d_8 = 0.042$ | |

-continued

| Embodiment 1 | | |
|---|---|---|
| $r_9 = 9.02$ | | |
| | $d_9 = 1.03$ | $CaF_2$ |
| $r_{10} = -2.38$ | | |
| | $d_{10} = 0.333$ | quartz |
| $r_{11} = 2.44$ | | |
| | $d_{11} = 0.914$ | $CaF_2$ |
| $r_{12} = -12.7$ | | |
| | $d_{12} = 0.030$ | |
| $r_{13} = 7.03$ | | |
| | $d_{13} = 0.345$ | quartz |
| $r_{14} = 1.70$ | | |
| | $d_{14} = 1.56$ | $CaF_2$ |
| $r_{15} = -2.02$ | | |
| | $d_{15} = 0.699$ | quartz |
| $r_{16} = 9.00$ | | |
| | $d_{16} = 13.4$ | |
| $r_{17} = -2.65$ | | |
| | $d_{17} = 1.43$ | $CaF_2$ |
| $r_{18} = 7.97$ | | |
| | $d_{18} = 1.38$ | quartz |
| $r_{19} = -3.16$ | | |
| | $d_{19} = 0.358$ | $CaF_2$ |
| $r_{20} = -5.38$ | | |
| $f_I = 1.89$, $f_{II} = 5.91$, $f_{III} = -28.7$ | | |
| $D = 13.4 (= d_{16})$ | | |

| Embodiment 2 | | |
|---|---|---|
| $f = 1$, $\beta = -80$, $NA = 0.80$ | | |
| | $d_0 = 0.053$ | |
| $r_1 = -0.544$ | | |
| | $d_1 = 0.315$ | quartz |
| $r_2 = -5.62$ | | |
| | $d_2 = 0.589$ | $CaF_2$ |
| $r_3 = -0.605$ | | |
| | $d_3 = 0.026$ | |
| $r_4 = -6.14$ | | |
| | $d_4 = 0.203$ | quartz |
| $r_5 = 8.21$ | | |
| | $d_5 = 0.934$ | $CaF_2$ |
| $r_6 = -1.32$ | | |
| | $d_6 = 0.125$ | |
| $r_7 = 179$ | | |
| | $d_7 = 1.18$ | $CaF_2$ |
| $r_8 = -1.23$ | | |
| | $d_8 = 0.387$ | quartz |
| $r_9 = 2.43$ | | |
| | $d_9 = 1.04$ | $CaF_2$ |
| $r_{10} = -4.16$ | | |
| | $d_{10} = 0.074$ | |
| $r_{11} = 9.22$ | | |
| | $d_{11} = 1.16$ | $CaF_2$ |
| $r_{12} = -2.07$ | | |
| | $d_{12} = 0.261$ | quartz |
| $r_{13} = 2.14$ | | |
| | $d_{13} = 1.03$ | $CaF_2$ |
| $r_{14} = -9.31$ | | |
| | $d_{14} = 8.30$ | |
| $r_{15} = 4.50$ | | |
| | $d_{15} = 1.98$ | quartz |
| $r_{16} = -2.06$ | | |
| | $d_{16} = 0.600$ | $CaF_2$ |
| $r_{17} = 2.36$ | | |
| $f_I = 1.52$, $f_{II} = 7.69$, $f_{III} = -34.6$ | | |
| $D = 8.3 (= d_{14})$ | | |

| Embodiment 3 | | |
|---|---|---|
| $f = 1$, $\beta = 80$, $NA = 0.80$ | | |
| | $d_0 = 0.063$ | |

-continued

| Embodiment 3 | | |
|---|---|---|
| $r_1 = -0.573$ | | |
| | $d_1 = 1.21$ | quartz |
| $r_2 = -0.927$ | | |
| | $d_2 = 0.035$ | |
| $r_3 = -46.2$ | | |
| | $d_3 = 1.00$ | $CaF_2$ |
| $r_4 = -1.76$ | | |
| | $d_4 = 0.035$ | |
| $r_5 = -8.28$ | | |
| | $d_5 = 0.350$ | quartz |
| $r_6 = 2.49$ | | |
| | $d_6 = 1.22$ | $CaF_2$ |
| $r_7 = -2.92$ | | |
| | $d_7 = 0.060$ | |
| $r_8 = 13.9$ | | |
| | $d_8 = 1.16$ | $CaF_2$ |
| $r_9 = -1.84$ | | |
| | $d_9 = 0.244$ | quartz |
| $r_{10} = 2.43$ | | |
| | $d_{10} = 0.977$ | $CaF_2$ |
| $r_{11} = 7.01$ | | |
| | $d_{11} = 0.046$ | |
| $r_{12} = 7.00$ | | |
| | $d_{12} = 0.279$ | quartz |
| $r_{13} = 2.02$ | | |
| | $d_{13} = 1.48$ | $CaF_2$ |
| $r_{14} = -2.44$ | | |
| | $d_{14} = 0.360$ | quartz |
| $r_{15} = 17.8$ | | |
| | $d_{15} = 10.7$ | |
| $r_{16} = -2.03$ | | |
| | $d_{16} = 0.383$ | $CaF_2$ |
| $r_{17} = 2.64$ | | |
| | $d_{17} = 1.58$ | quartz |
| $r_{18} = -1.78$ | | |
| | $d_{18} = 0.442$ | $CaF_2$ |
| $r_{19} = -5.20$ | | |
| $f_I = 2.08$, $f_{II} = 5.77$, $f_{III} = -15.4$ | | |
| $D = 10.7 (= d_{15})$ | | |

| Embodiment 4 | | |
|---|---|---|
| $f = 1$, $\beta = -100$, $NA = 0.80$ | | |
| | $d_0 = 0.067$ | |
| $r_1 = -0.707$ | | |
| | $d_1 = 0.242$ | quartz |
| $r_2 = 1.32$ | | |
| | $d_2 = 0.977$ | $CaF_2$ |
| $r_3 = -0.863$ | | |
| | $d_3 = 0.031$ | |
| $r_4 = -36.9$ | | |
| | $d_4 = 0.990$ | $CaF_2$ |
| $r_5 = -1.76$ | | |
| | $d_5 = 0.044$ | |
| $r_6 = 23.3$ | | |
| | $d_6 = 0.329$ | quartz |
| $r_7 = 2.10$ | | |
| | $d_7 = 1.43$ | $CaF_2$ |
| $r_8 = -3.65$ | | |
| | $d_8 = 0.043$ | |
| $r_9 = -11.4$ | | |
| | $d_9 = 0.331$ | quartz |
| $r_{10} = 2.14$ | | |
| | $d_{10} = 1.36$ | $CaF_2$ |
| $r_{11} = -7.47$ | | |
| | $d_{11} = 0.065$ | |
| $r_{12} = -140$ | | |
| | $d_{12} = 0.369$ | quartz |
| $r_{13} = 2.10$ | | |
| | $d_{13} = 1.10$ | $CaF_2$ |
| $r_{14} = -11.9$ | | |
| | $d_{14} = 0.087$ | |
| $r_{15} = 8.01$ | | |

-continued

Embodiment 4

| | | |
|---|---|---|
| $r_{16} = -2.19$ | $d_{15} = 1.32$ | $CaF_2$ |
| $r_{17} = 15.0$ | $d_{16} = 1.22$ | quartz |
| $r_{18} = -2.91$ | $d_{17} = 14.1$ | |
| $r_{19} = 4.71$ | $d_{18} = 1.02$ | $CaF_2$ |
| $r_{20} = -2.48$ | $d_{19} = 1.41$ | quartz |
| $r_{21} = -7.22$ | $d_{20} = 0.348$ | $CaF_2$ |

$f_I = 1.95, f_{II} = 6.51, f_{III} = -21.0$
$D = 14.1 (= d_{17})$

Embodiment 5

$f = 1, \beta = -100, NA = 0.8$

| | | |
|---|---|---|
| | $d_0 = 0.068$ | |
| $r_1 = -0.628$ | $d_1 = 0.264$ | quartz |
| $r_2 = \infty$ | $d_2 = 0.969$ | $CaF_2$ |
| $r_3 = -0.831$ | $d_3 = 0.029$ | |
| $r_4 = -13.3$ | $d_4 = 0.953$ | $CaF_2$ |
| $r_5 = -1.71$ | $d_5 = 0.042$ | |
| $r_6 = \infty$ | $d_6 = 0.316$ | quartz |
| $r_7 = 1.87$ | $d_7 = 1.27$ | $CaF_2$ |
| $r_8 = -3.60$ | $d_8 = 0.042$ | |
| $r_9 = 9.18$ | $d_9 = 0.999$ | $CaF_2$ |
| $r_{10} = -2.35$ | $d_{10} = 0.333$ | quartz |
| $r_{11} = 2.25$ | $d_{11} = 0.907$ | $CaF_2$ |
| $r_{12} = -11.9$ | $d_{12} = 0.030$ | |
| $r_{13} = 7.06$ | $d_{13} = 0.339$ | quartz |
| $r_{14} = 1.75$ | $d_{14} = 1.55$ | $CaF_2$ |
| $r_{15} = -2.21$ | $d_{15} = 0.706$ | quartz |
| $r_{16} = 8.76$ | $d_{16} = 10.0$ | |
| $r_{17} = 8.03$ | $d_{17} = 1.06$ | quartz |
| $r_{18} = -34.4$ | $d_{18} = 0.583$ | $CaF_2$ |
| $r_{19} = 5.55$ | $d_{19} = 2.18$ | |
| $r_{20} = -2.15$ | $d_{20} = 1.48$ | $CaF_2$ |
| $r_{21} = 10.4$ | $d_{21} = 1.38$ | quartz |
| $r_{22} = -3.87$ | | |

$f_I = 1.93, f_{II} = 5.95, f_{III} = -27.1$
$D = 10 (= d_{16})$

Embodiment 6

$f = 1, \beta = -80, NA = 0.80$

| | | |
|---|---|---|
| | $d_0 = 0.056$ | |
| $r_1 = -0.611$ | | |

Embodiment 6

| | | |
|---|---|---|
| $r_2 = -15.34$ | $d_1 = 0.374$ | quartz |
| $r_3 = -0.594$ | $d_2 = 0.439$ | $CaF_2$ |
| $r_4 = -1.91$ | $d_3 = 0.046$ | |
| $r_5 = -1.46$ | $d_4 = 0.777$ | $CaF_2$ |
| $r_6 = -3.15$ | $d_5 = 0.035$ | |
| $r_7 = -1.51$ | $d_6 = 0.687$ | $CaF_2$ |
| $r_8 = -13.9$ | $d_7 = 0.010$ | |
| $r_9 = -1.34$ | $d_8 = 0.98$ | $CaF_2$ |
| $r_{10} = 2.41$ | $d_9 = 0.294$ | quartz |
| $r_{11} = -4.46$ | $d_{10} = 0.892$ | $CaF_2$ |
| $r_{12} = 14.4$ | $d_{11} = 0.039$ | |
| $r_{13} = -6.96$ | $d_{12} = 1.04$ | $CaF_2$ |
| $r_{14} = 2.26$ | $d_{13} = 0.294$ | quartz |
| $r_{15} = -8.07$ | $d_{14} = 1.07$ | $CaF_2$ |
| $r_{16} = 3.96$ | $d_{15} = 5.86$ | |
| $r_{17} = 32.7$ | $d_{16} = 2.74$ | $CaF_2$ |
| $r_{18} = 2.41$ | $d_{17} = 1.11$ | quartz |

$f_I = 1.59, f_{II} = 9.84, f_{III} = -38.2$
$D = 5.86 (= d_{15})$ wherein the reference symbols $r_1, r_2, \ldots$ represent the radii of curvature on the surfaces of the respective lens elements, and the reference symbols $d_1, d_2, \ldots$ designate the thicknesses of the respective lens elements and the airspaces reserved therebetween.

The Embodiment 1 has the composition illustrated in FIG. 1 wherein the first lens unit consists of a cemented doublet having a concave surface on the object side and a positive lens component, the second lens unit consists of three positive cemented lens components and has a positive refractive power as a whole, and the third lens unit consists of a negative cemented lens component composed of three lens elements.

Figure 2:
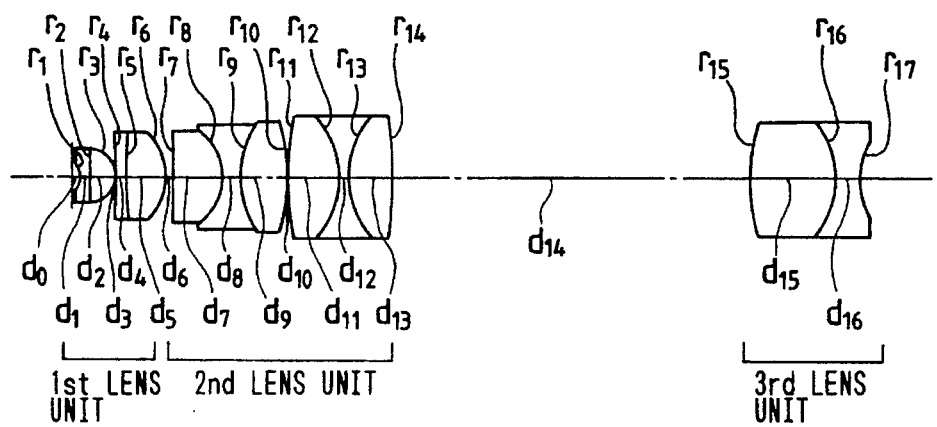

The Embodiment 2 has the composition illustrated in FIG. 2 which is different from that of the Embodiment in the points described below. In the Embodiment 2, the positive lens component arranged in the first lens unit is designed as a cemented doublet, the second lens unit is composed of two cemented lens components and the third lens unit is designed as a cemented doublet consisting of two lens elements.

Figure 3:
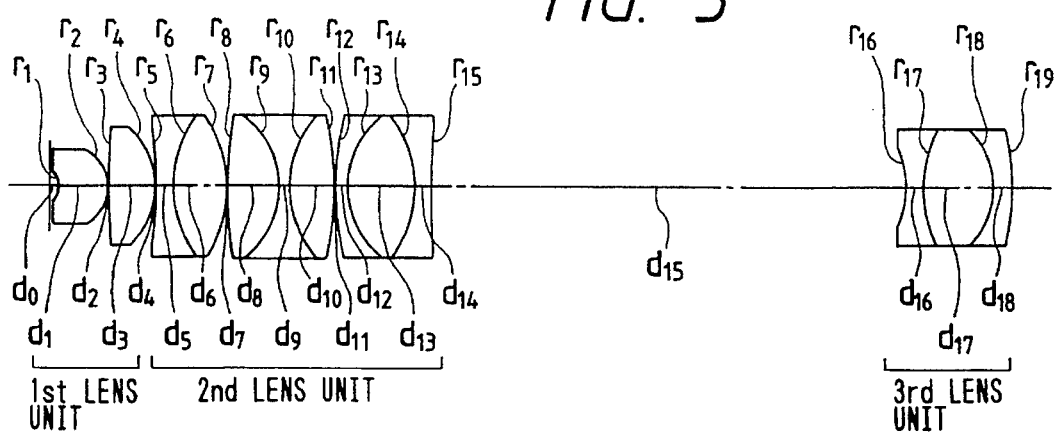

The Embodiment 3 has the composition illustrated in FIG. 3 and is different from the Embodiment 1 in that the lens component arranged on the object side in the first lens unit of the Embodiment 3 is composed of a single lens element.

Figure 4:
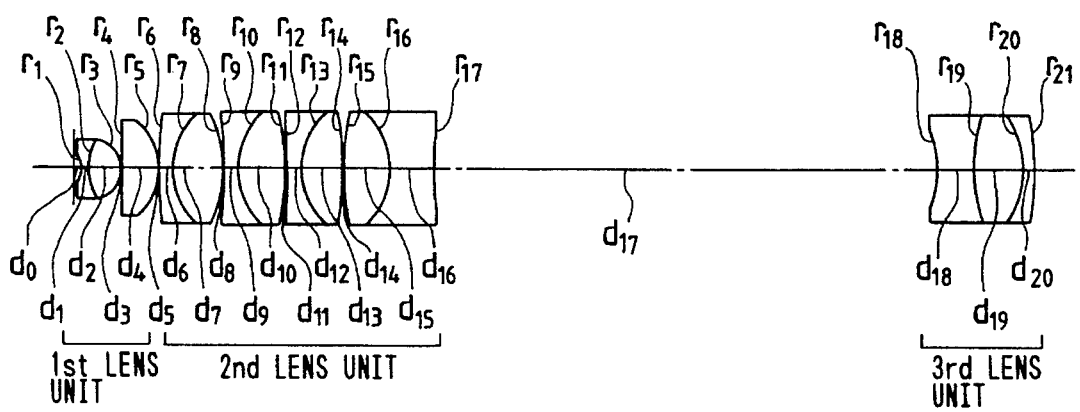

The Embodiment 4 has the composition shown in FIG. 4 and is different from the Embodiment 1 in that the second lens unit used in the Embodiment 4 is composed of four cemented doublets.

Figure 5:
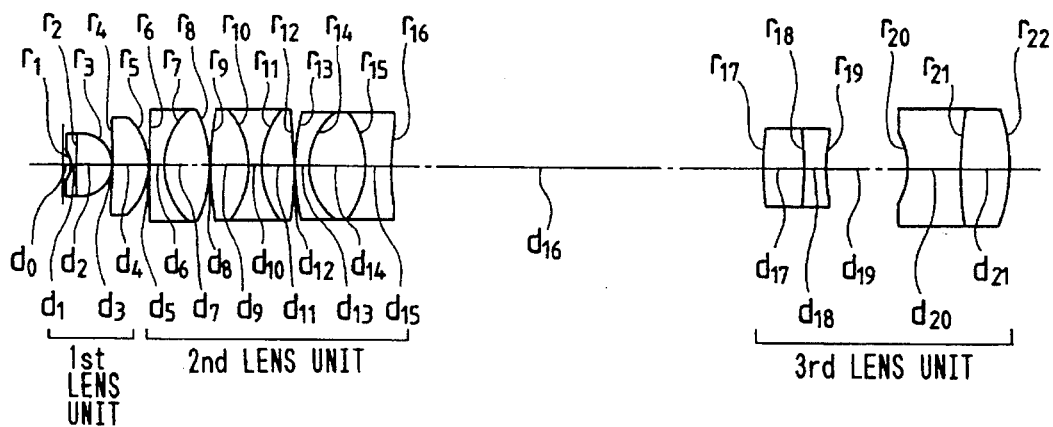

The Embodiment 5 has the composition shown in FIG. 5 and is different from the Embodiment 1 in that the third lens unit arranged in the Embodiment 5 is composed of two cemented doublets which have concave surfaces opposite to each other.

Figure 6:
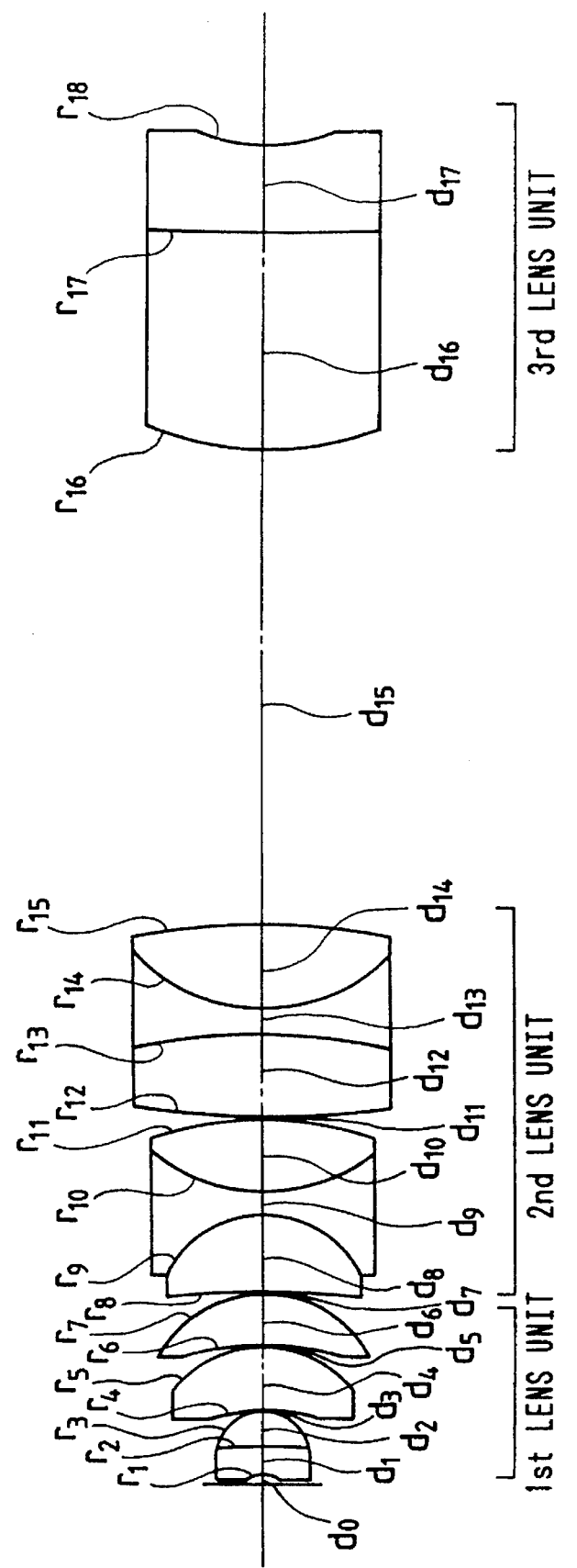
Figure 7:
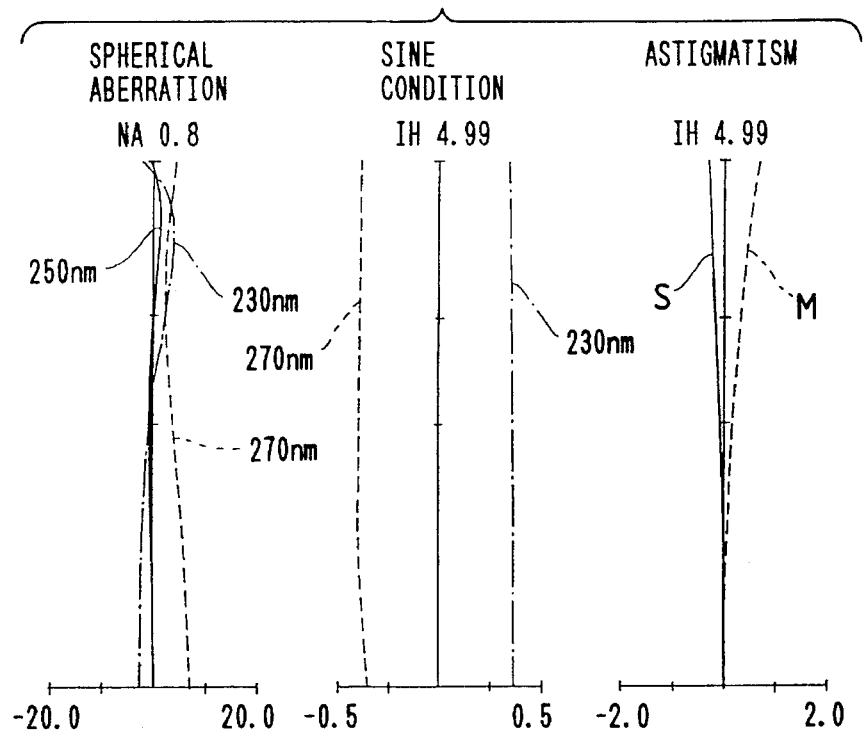
FIG. 7 through FIG. 12 show graphs illustrating aberration characteristics of the Embodiments 1 through 6 respectively of the present invention.
Figure 8:
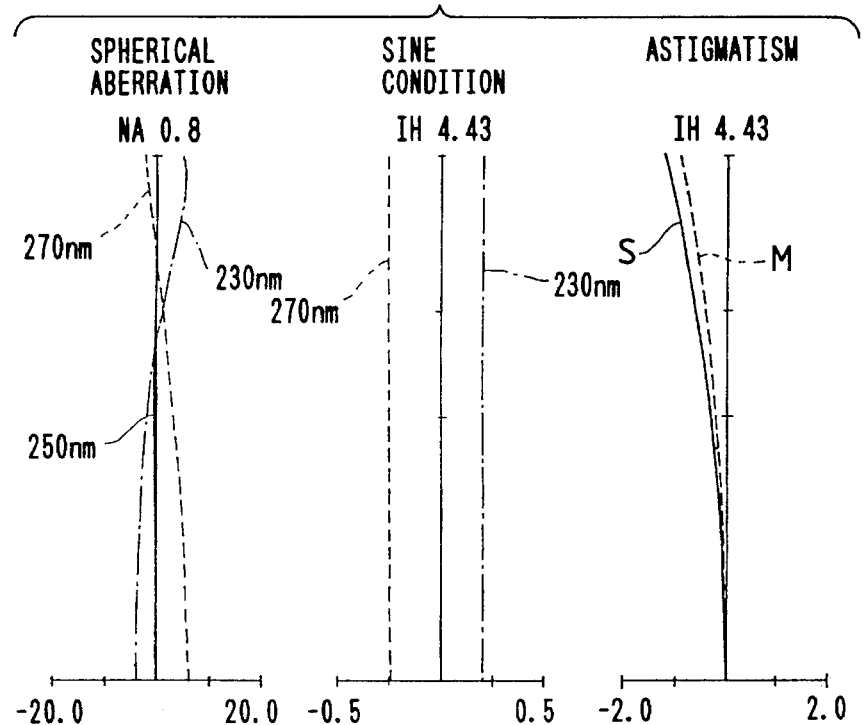
Figure 9:
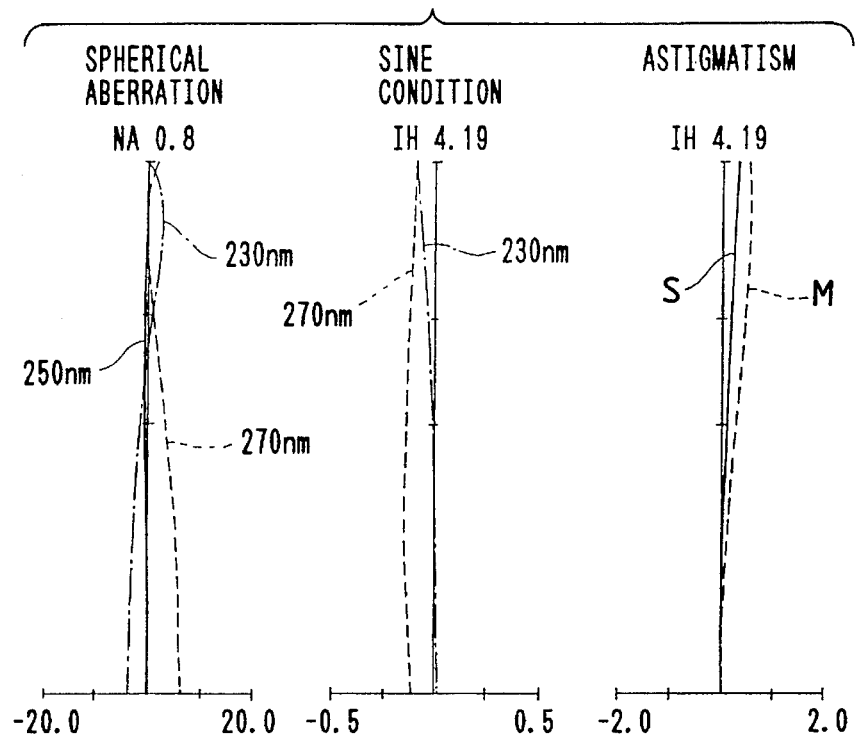
Figure 10:
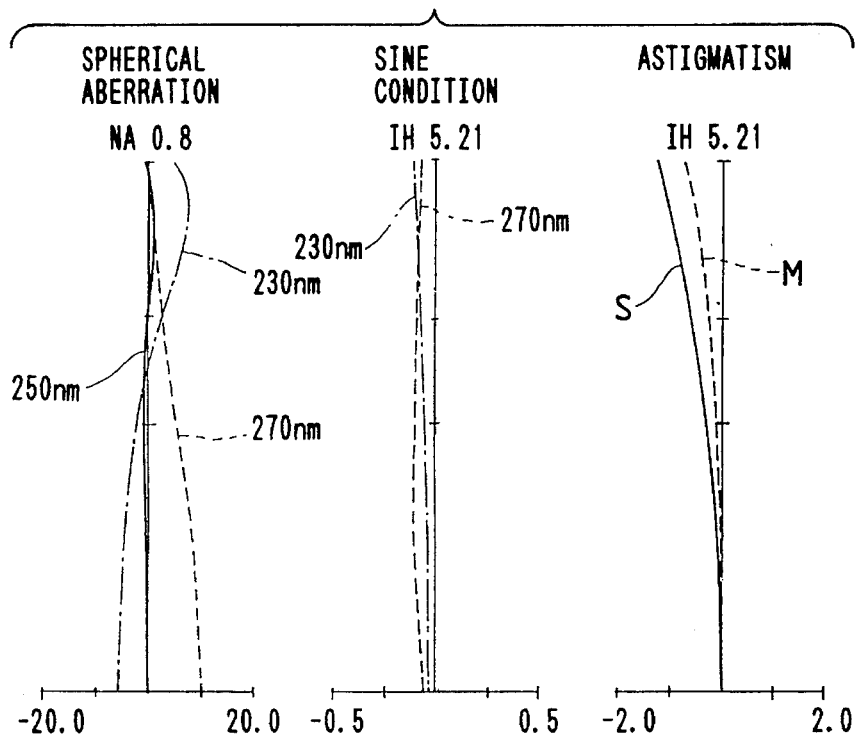
Figure 11:
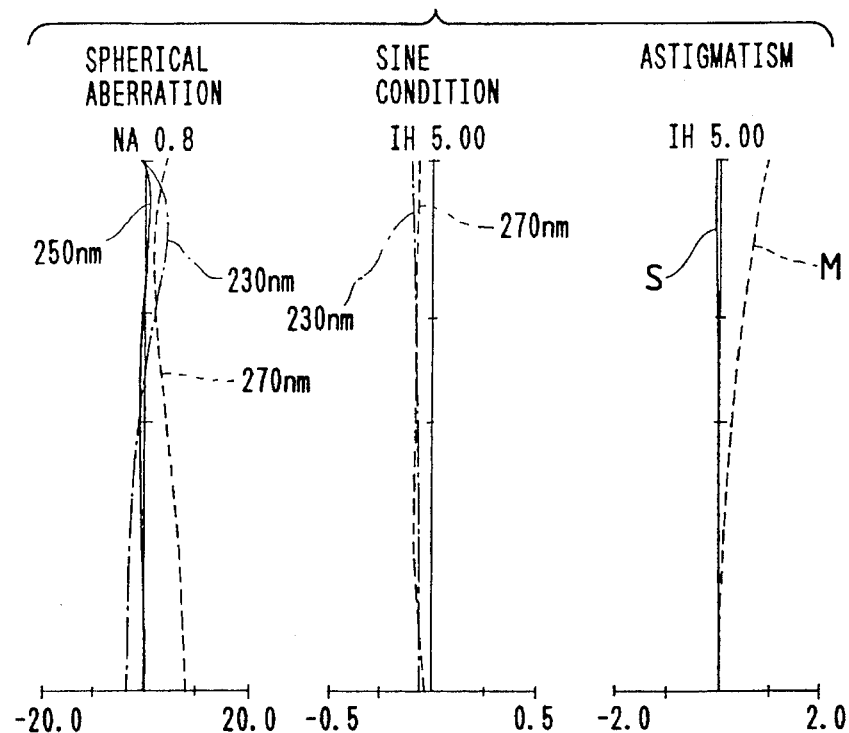
Figure 12:
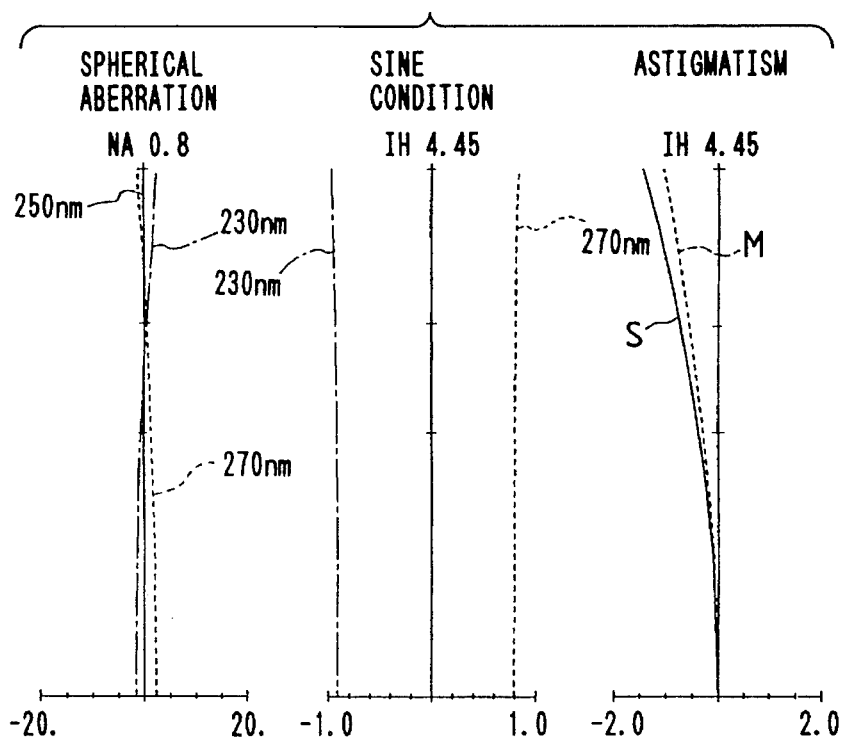

The sixth embodiment has a composition as illustrated in FIG. 6, and differs from the second embodiment in that the sixth embodiment includes two positive lens components, each of which has a convex surface on the side of emergence.

In each of the embodiments described above, chromatic aberration is corrected within a wavelength range of 250 nm±20 nm.

As is understood from the foregoing description, the objective lens system according to the present invention is usable at wavelengths shorter than 300 nm within the ultraviolet region, has a high magnification, high resolution and a large numerical aperture, assures flatness of image surface, and has chromatic aberration favorably corrected within a definite wavelength range.

I claim:

1. An objective lens system, which transmits ultraviolet rays, comprising in order from an object side thereof:
    a first lens unit comprising a meniscus lens component having an object side concave surface having high curvature and a positive lens component having an emergence side convex surface;
    a second lens unit comprising at least three cemented lens components; and
    a third lens unit comprising a negative cemented lens component and having a negative refractive power as a whole;
    each lens element in said first lens unit, said second lens unit, and said third lens unit being made of an optical material providing an internal transmittance of at least 50% for a ray having a wavelength of 300 nm when said optical material is 5 mm thick.

2. An objective lens system that transmits ultraviolet rays, comprising, in order from an object side thereof:
    a first lens unit comprising a meniscus lens component having an object side concave surface having a high curvature and a positive lens component having an emergence side convex surface;
    a second lens unit comprising three or more cemented lens components including a cemented doublet lens component and a plurality of cemented triplet lens components; and
    a third lens unit comprising a negative cemented lens component and having a negative refractive power as a whole;
    each lens element in said first lens unit, said second lens unit, and said third lens unit being made of an optical material providing an internal transmittance of at least 50% for a ray having a wavelength of 300 nm when said optical material is 5 mm thick.

3. An objective lens system comprising, in order from an object side thereof:
    a first lens unit comprising a meniscus lens component having an object side concave surface having a high curvature and a positive lens component having an emergence side convex surface;
    a second lens unit comprising two cemented triplet lens components; and
    a third lens unit comprising a negative cemented lens component and having a negative refractive power as a whole;
    each lens element in said first lens unit, said second lens unit, and said third lens unit being made of an optical material providing an internal transmittance of at least 50% for a ray having a wavelength of 300 nm when said optical material is 5 mm thick.

4. An objective lens system according to any one of claims 1, 2, or 3, wherein:
    said meniscus lens component in said first lens unit is a cemented doublet consisting of a negative lens element made of quartz and a positive lens element made of one of calcium fluoride and lithium fluoride, said negative lens element being arranged to said object side of said meniscus lens component relative to said positive lens element.

5. An objective lens system according to claim 4, satisfying the following conditions (1), (2) and (3):

$$0.5 \leq f_I/f \leq 3 \qquad (1)$$

$$3 \leq f_{II}/f \leq 15 \qquad (2)$$

$$7 \leq -f_{III}/f \qquad (3)$$

wherein reference symbol f represents a focal length of said objective lens system as a whole, reference symbol $f_I$ designates a focal length of said first lens unit, reference symbol $f_{II}$ denotes a focal length of said second lens unit, and reference symbol $f_{III}$ represents a focal length of said third lens unit.

6. An objective lens system according to claim 5 satisfying the following condition (4):

$$4 \leq D/f \qquad (4)$$

wherein reference symbol D represents an air-space reserved between said second lens unit and said third lens unit.

7. An objective lens system according to claim 4, wherein said second lens unit comprises a positive lens element and a negative lens element, said positive lens element being made of one of calcium fluoride and lithium fluoride and said negative lens element being made of quartz.

8. An objective lens system according to claim 7, wherein said third lens unit comprises a negative lens element made of one of calcium fluoride and lithium fluoride.

9. An objective lens system, which transmits ultraviolet rays, for microscopes comprising:
    a first lens unit including a cemented meniscus lens component having a concave surface on an object side thereof and a positive lens component having a convex surface on an image side thereof;
    a second lens unit comprising a cemented doublet lens component and two cemented triplet lens components; and
    a third lens unit comprising a negative cemented lens component having a concave surface on an object side thereof:
        each lens element in said first lens unit, said second lens unit, and said third lens unit being made of an optical material providing an internal transmittance of at least 50% for a ray having a wavelength of 300 nm when said optical material is 5 mm thick.

10. An objective lens system, which transmits ultraviolet rays, for microscopes comprising:
    a first lens unit comprising a cemented meniscus lens component having a concave surface on an object side thereof and a cemented doublet lens component having a convex surface on an image side thereof;
    a second lens unit comprising two cemented triplet lens components; and
    a third lens unit comprising a negative cemented lens component having a convex surface on an object side thereof:

each lens element in said first lens unit, said second lens unit, and said third lens unit being made of an optical material providing an internal transmittance of at least 50% for a ray having a wavelength of 300 nm when said optical material is 5 mm thick.

11. An objective lens system, which transmits ultraviolet rays, for microscopes comprising:

a first lens unit comprising a single meniscus lens component having a concave surface on an object side thereof and a positive lens component having a convex surface on an image side thereof;

a second lens unit comprising a cemented doublet lens component and two cemented triplet lens components; and a third lens unit comprising a negative cemented lens component having a concave surface on an object side thereof:

each lens element in said first lens unit, said second lens unit, and said third lens unit being made of an optical material providing an internal transmittance of at least 50% for a ray having a wavelength of 300 nm when said optical material is 5 mm thick.

12. An objective lens system, which transmits ultraviolet rays, for microscopes comprising:

a first lens unit comprising a cemented meniscus lens component having a concave surface on an object side thereof and a positive lens component having a convex surface on an image side thereof;

a second lens unit comprising four cemented doublet lens components; and a third lens unit comprising a negative cemented lens component having a concave surface on an object side thereof:

each lens element in said first lens unit, said second lens unit, and said third lens unit being made of an optical material providing an internal transmittance of at least 50% for a ray having a wavelength of 300 nm when said optical material is 5 mm thick.

13. An objective lens system, which transmits ultraviolet rays, for microscopes comprising:

a first lens unit comprising a cemented meniscus lens component having a concave surface on an object side thereof and a positive lens component having a convex surface on an image side thereof;

a second lens unit comprising a cemented doublet lens component and two cemented triplet lens components; and a third lens unit comprising a cemented doublet lens component having a convex surface on an object side thereof and a negative cemented lens component having a concave surface on an object side thereof:

each lens element in said first lens unit, said second lens unit, and said third lens unit being made of an optical material providing an internal transmittance of at least 50% for a ray having a wavelength of 300 nm when said optical material is 5 mm thick.

14. An objective lens system, which transmits ultraviolet rays, for microscopes comprising:

a first lens unit comprising a cemented meniscus lens component having a concave surface on an object side thereof and a positive lens component having a convex surface on an image side thereof;

a second lens unit comprising two cemented triplet lens components; and a third lens unit comprising a negative cemented lens component having a convex surface on an object side thereof:

each lens element in said first lens unit, said second lens unit, and said third lens unit being made of an optical material providing an internal transmittance of at least 50% for a ray having a wavelength of 300 nm when said optical material is 5 mm thick.

* * * * *